(No Model.)
J. J. HOLLAND.
BOLT.
No. 389,704. Patented Sept. 18, 1888.
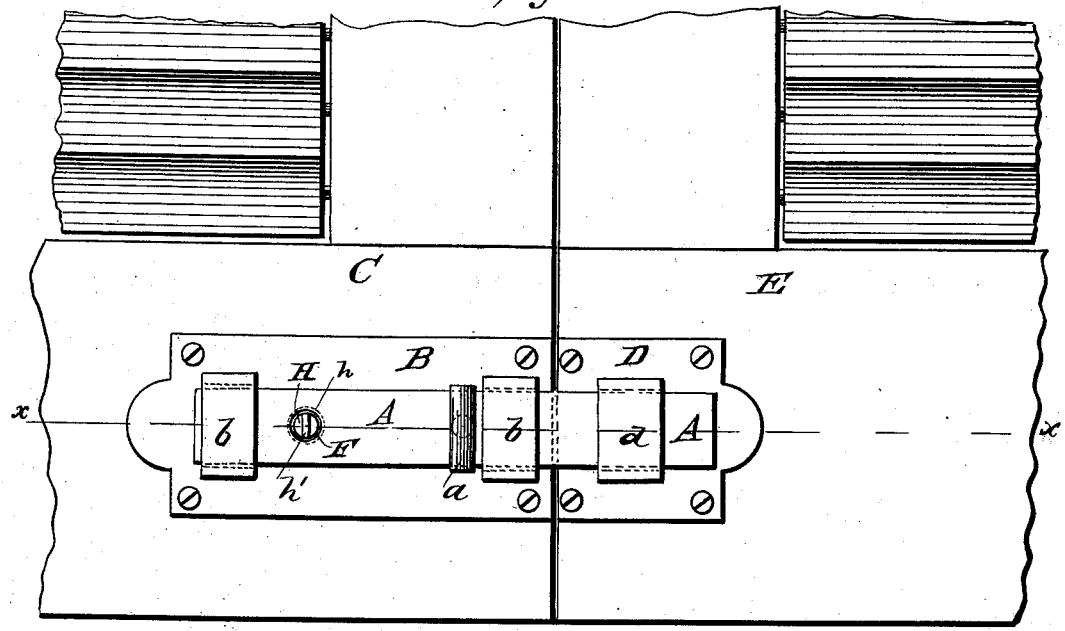
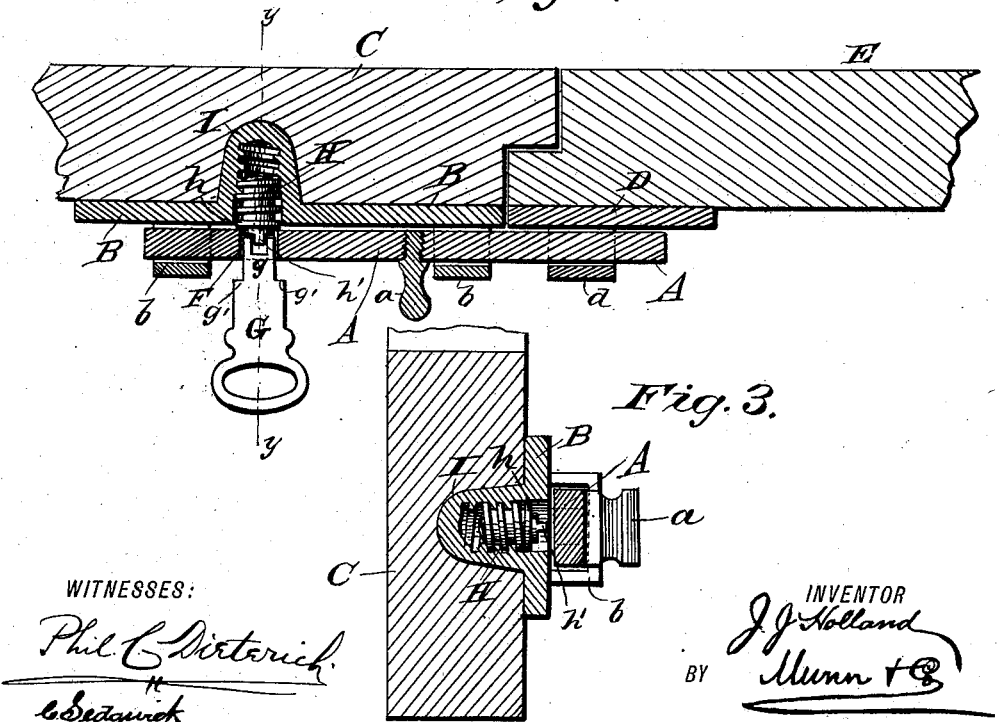
WITNESSES:
INVENTOR
J. J. Holland
BY Munn & Co.
ATTORNEY

United States Patent Office.

JOHN J. HOLLAND, OF NEW ORLEANS, LOUISIANA.

BOLT.

SPECIFICATION forming part of Letters Patent No. 389,704, dated September 18, 1888.

Application filed May 23, 1888. Serial No. 274,814. (No model.)

*To all whom it may concern:*

Be it known that I, JOHN J. HOLLAND, of New Orleans, in the parish of Orleans and State of Louisiana, have invented a new and Improved Lock-Bolt, of which the following is a full, clear, and exact description.

My invention relates to a lock-bolt adapted more particularly for locking or fastening outside blinds of windows against intruders, but applicable for fastening doors or other structures; and the invention has for its object to provide a simple, inexpensive, and efficient device of this character.

The invention consists in certain novel features of construction and combinations of parts of the lock-bolt, all as hereinafter described and claimed.

Reference is to be had to the accompanying drawings, forming a part of this specification, in which similar letters of reference indicate corresponding parts in all the figures.

Figure 1 is an inner face view of the lower outer corners of a pair of ordinary Venetian blinds with my improved lock-bolt applied thereto, the blinds being locked closed. Fig. 2 is a sectional plan view taken on the line $x$ $x$ in Fig. 1, and with the key applied, as when locking or unlocking the bolt, the bolt being shown locked; and Fig. 3 is a vertical transverse section taken on the line $y$ $y$ in Fig. 2, but with the bolt unlocked.

The bolt-bar A is preferably fitted to slide in keepers $b$ $b$, fixed to a base-plate, B, which is to be fixed by screws or otherwise to the inner face of one of the window-blinds, C, and so that the outer end of the bar may be shot into a catch or keeper, $d$, fixed, preferably, to a base-plate, D, which is fastened by screws or otherwise to the other window-blind, E, of the pair of blinds, which are shown only in part, but which may be hung at their outer edges in any approved way to the window-frame stiles. The bolt-bar is provided with a thumb piece or plate, $a$, which is preferably made with a screw-threaded stem adapted to a tapped hole in the bar, as shown in Fig. 2, which is a cheap construction, and preferably over a thumb piece secured to the bar by riveting a stem of it at the back face of the bar.

The bolt-bar A is provided with a hole, F, which is adapted to receive the bit $g$ of a key, G, and when the bolt is projected this hole F coincides or registers with the outer end of a screw, H, which is threaded into a nut, I, which is preferably formed by tapping out a lug cast upon the inner or back face of the bolt-bar plate B; but, if preferred, the nut may be formed separately from the plate, and may be attached thereto in any approved way, allowing the screw H to be turned out into the bolt-bar hole F or turned inward clear of said hole and the bar. Figs. 2 and 3 of the drawings show that the screw H is provided near its outer end with a collar, $h$, which is larger than the extremity of the body of the screw which fits the bolt-bar hole F and is about the same diameter as the outer faces or periphery of the threads of the screw. A shoulder is thus provided at the outer face of the collar $h$, which is adapted to strike the inner face of the bolt-bar A, while the outer end or head of the screw enters the hole F in said bar. The outer part of the bore of the nut I, or that part of the bore passing through the plate B, is devoid of threads, to allow the locking-screw collar $h$ to pass within the nut as it is turned back far enough to allow its outer end to stand flush with or a little back of the outer face of the plate B.

At its outer end the locking-screw H may be provided with a ward of any approved form. The ward shown is a simple transverse central tongue, $h'$, and the key G shown has a notch in its bit $g$, which fits over the ward and allows the screw to be turned by the key. I purpose, however, to provide differently-shaped wards on the outer ends of the screws H of a series of the locking-bolts while fitting any of the screws to all the nuts I of the bolts, and thus, while every screw H can be turned or operated only by its own key, the screws of the series of bolts may be readily interchanged by removing the thumb-pieces $a$ of the bolt-bars and then slipping the bars out of their keepers $b$ on the plate B to give access to the screws. This interchangeability of the locking-screws is a very desirable feature, as it increases the chances of complete safety by preventing easy tampering with the bolt-screw on the blinds of any particular window more exposed than others to be opened from the outside by intruders. Next its bit $g$ the key G is provided with a shoulder or shoulders, $g'$, which limit the inward movement of the key when the screw H shall have been turned far enough into the nut I to cause the screw to clear the bolt-bar A, and the outward movement of the screw by the key is limited by contact of the screw-shoulder $h$ with the back of the bar, at which time the screw enters the bar sufficiently to lock it against endwise movement, while leaving the end of the screw concealed or covered by the plate in a manner making the operation of the screw quite impossible from the outside of the window and difficult from inside the blinds without the key.

It is obvious, when the blinds are closed and the bolt-bar A is shot into the keepers $b$ of the plate B, that the key G may then be inserted in the hole F of bar A to turn the screw H out into the bar for securely locking it, or for turning the screw back for unlocking it to allow the bolt-bar to be withdrawn when the blinds are next to be opened.

In so far as the principle of operation of this locking-bolt is concerned, the nut I may be formed on the keeper-plate D, and the screw H fitting the nut would then enter a hole, F, at the other end of the bolt-bar A; hence either plate B D may be considered the base-plate within the scope of the claims hereinafter set forth. Furthermore, the plate or plates B D may be dispensed with, provided the keepers $b\ d$ be fitted to the blinds, and in this case the nut I, holding the screw H, would be fixed directly in or to the rail or stile of the blind, and any suitable instrument or device may be used for turning the screw to lock or unlock the bolt-bar, as will readily be understood.

Having thus fully described my invention, I claim as new and desire to secure by Letters Patent—

1. The combination, in a lock-bolt, of a sliding bar having a hole passing through it, a nut fitted to the blind or other object to be fastened, and a screw fitted to the nut and operative through the bar-hole from outside the bar when said bar is projected, substantially as herein set forth.

2. The combination, in a lock-bolt, of a sliding bar provided with a hole, a nut fitted to the blind or other object to be fastened, a screw fitted to the nut, and a key adapted to the hole in the bar to operate the screw for locking and unlocking the bar when it is projected, substantially as herein set forth.

3. The combination, in a lock-bolt, of a base-plate, a nut formed integral therewith, a sliding bar on said plate provided with a hole, and a screw fitted to the nut and adapted to enter the hole in the bar for locking it when projected, substantially as herein set forth.

4. The combination, in a lock-bolt, of a sliding bar provided with a hole, a nut fitted to the blind or other object to be fastened, and a screw fitted to the nut and adapted to the bar-hole, and provided with a collar or stop-shoulder limiting the outward movement of the screw in the sliding bar, substantially as herein set forth.

JOHN J. HOLLAND.

Witnesses:
  JOHN W. LEHMAN,
  I. A. RINZ.